Nov. 24, 1953 J. C. D'ESPOSITO 2,660,297
BICYCLE WHEEL BRACE
Filed Feb. 27, 1951 2 Sheets-Sheet 1
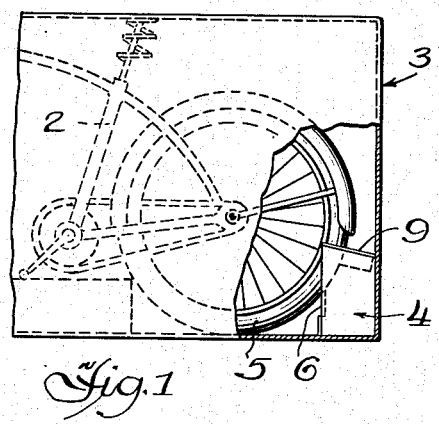
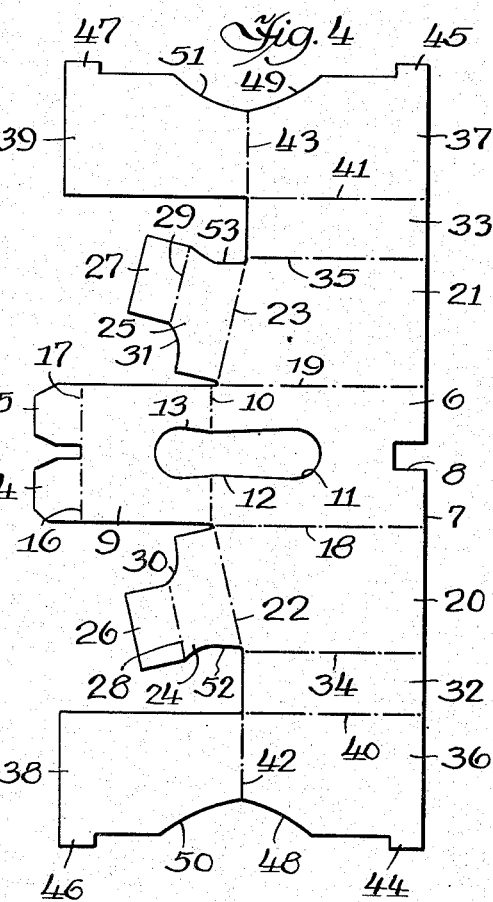
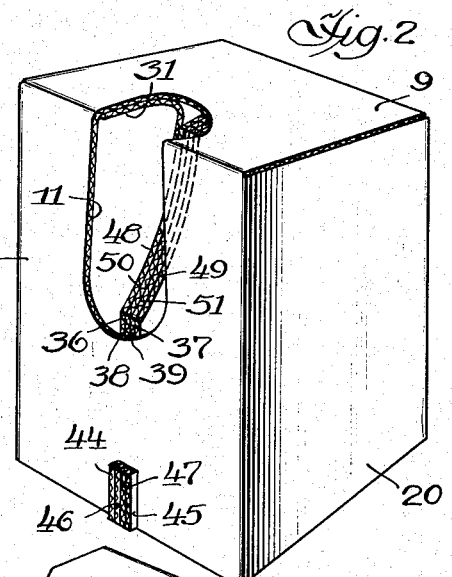
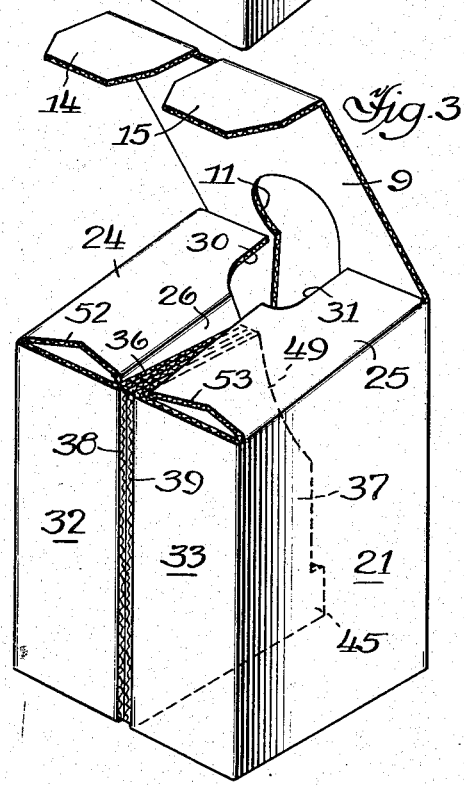
Inventor
JULIAN CARROLL D'ESPOSITO
By: EdWagonseller
Atty.

Nov. 24, 1953
J. C. D'ESPOSITO
2,660,297
BICYCLE WHEEL BRACE
Filed Feb. 27, 1951
2 Sheets-Sheet 2
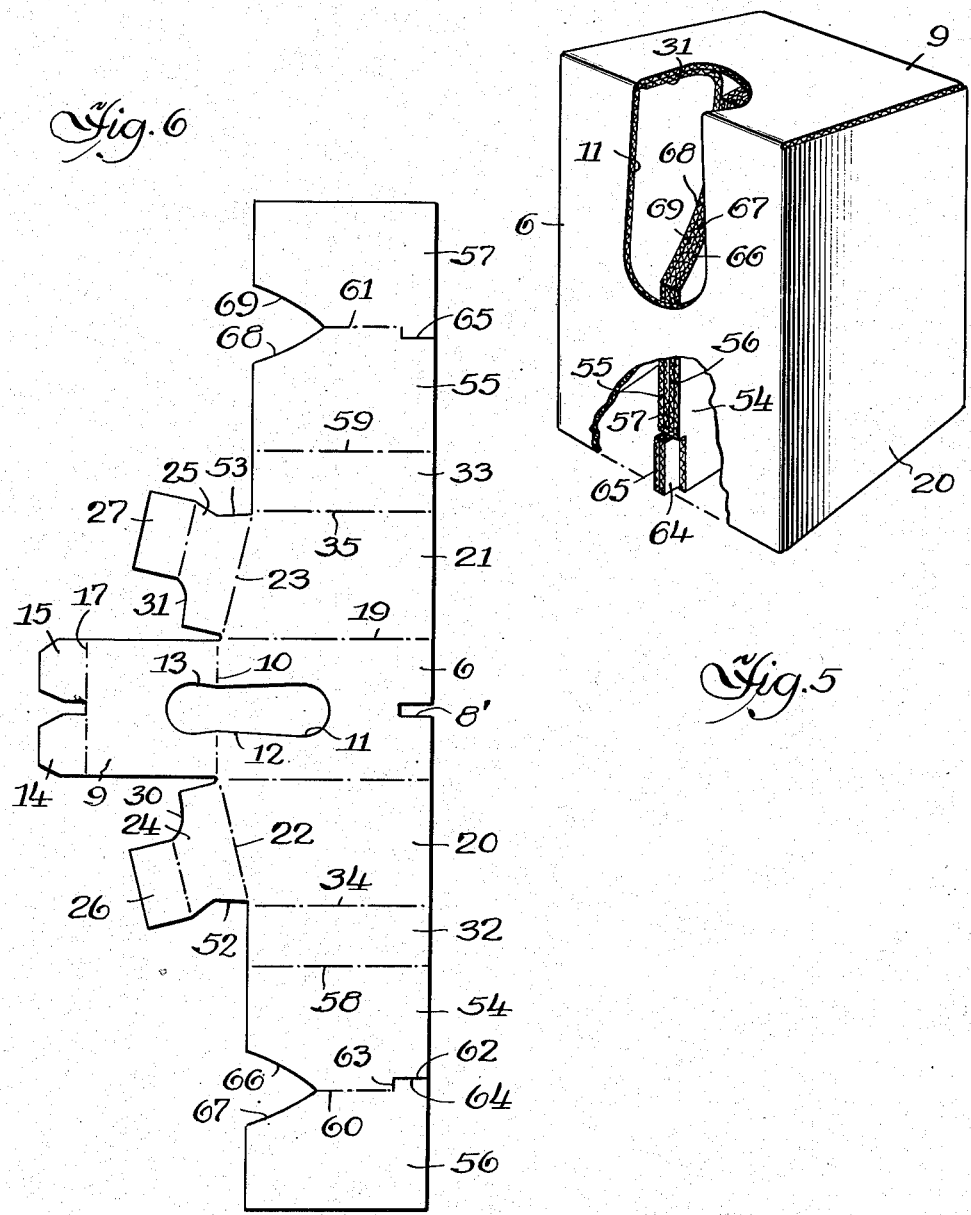
Inventor,
JULIAN CARROLL D'ESPOSITO
By: E.W.Wagonseller Atty.

Patented Nov. 24, 1953

2,660,297

UNITED STATES PATENT OFFICE 2,660,297

BICYCLE WHEEL BRACE

Julian Carroll D'Esposito, Chicago, Ill., assignor to Container Corporation of America, Chicago, Ill., a corporation of Delaware Application February 27, 1951, Serial No. 212,988

11 Claims. (Cl. 206—46)

This invention relates to a bicycle wheel brace formed of corrugated paperboard or the like of the type used within an outer shipping container to protect a bicycle or similar article from damage in transit.

The brace embodying the present invention is particularly adapted to engage and hold the wheel of a bicycle or similar article against shifting either transversely or longitudinally in a rearward direction. In general the brace comprises a sheet of corrugated paperboard folded and locked into predetermined form by flaps provided for the purpose. The brace may be of the same width as the interior of the shipping container so that it may be positioned in the lower rear corner of the container and held in place by the weight of the bicycle.

It is an object of the invention to provide a simple and easily assembled brace of corrugated paperboard or the like that may be readily positioned in a shipping container to hold the wheel of a bicycle or similar article to protect it from damage caused by shifting of the bicycle during shipment. It is another object of the invention to provide a single blank of corrugated paperboard which has been suitably cut and creased to enable it to be shipped flat to the user and quickly set up by the user without the use of staples or adhesive. It is a further object of the invention to provide a brace in which a multiplicity of panels of corrugated paperboard are arranged so that the thrust of the bicycle in a longitudinal direction is parallel to the planes of the panels to provide the maximum resistance to such thrust.

Additional objects and advantages of the present invention will become apparent upon reading the following description, taken in conjunction with the accompanying drawing showing a preferred illustrative embodiment of the invention, in which:

Fig. 1 is a fragmentary elevational view of a shipping container with a portion broken away to show a brace embodying the present invention in holding engagement with the wheel of a bicycle packed in the container;

Fig. 2 is a perspective view looking towards the front of a wheel brace in assembled condition ready for insertion into a shipping container;

Fig. 3 is a perspective view of a wheel brace in partially assembled position looking at the back of the brace;

Fig. 4 is a plan view of the blank from which the wheel brace is made;

Fig. 5 is a perspective view similar to Fig. 2, showing a modified embodiment of the wheel brace; and Fig. 6 is a plan view of the blank from which the wheel brace shown in Fig. 5 is made.

Referring to Fig. 1 of the drawing, a partially assembled bicycle 2 is shown in a shipping container 3, with the wheel brace 4 applied to the rear wheel 5. Although the brace may be applied to the front wheel, it is generally considered not necessary to provide such bracing for the front wheel because the front mud guard can not be pressed against the adjacent end of the shipping container and damaged thereby. The mud guard of the back wheel of a bicycle in transit is particularly susceptible to damage because a jolt in the longitudinal direction of the bicycle can force the whole weight of the bicycle against it.

The blank for the wheel brace, illustrated in Fig. 4, may be manufactured from any suitable sheet material such as corrugated paperboard. A panel 6, which forms the front wall of the brace when it is completely assembled, is formed centrally of the blank. One edge 7 is provided with a notch 8 for a purpose hereinafter described. The opposite edge has an outer top wall panel 9 extending therefrom with a fold line 10 extending between panels 6 and 9. An elongated cut out 11 is provided in panels 6 and 9. The opposite longitudinal side walls 12 and 13 of the cut out 11 taper inwardly slightly from the ends of the cut out to the fold line 10. In the assembled brace the cut out 11 engages the bicycle wheel, and the taper is provided to afford a frictional grip against the sides of the wheel. The exact size and shape of the portions of the cut out in panels 6 and 9 are determined by the proportions of the wheel parts received therein. Flap means comprising either a single bifurcated flap or a pair of flaps 14 and 15 integral with panel 9 are hinged thereto along fold lines 16 and 17, respectively.

On each side of panel 6 and defined therefrom by fold lines 18 and 19 are formed panels 20 and 21, respectively, which form the side walls of the assembled brace. The top edges of panels 20 and 21 defined by fold lines 22 and 23, respectively, extend angularly toward the notched blank edge from their ends adjacent panel 6. An inner top flap 24 is hinged to panel 20 along fold line 22, and a similar flap 25 is hinged to panel 21 along fold line 23. Tuck flaps 26 and 27 are hinged to flaps 24 and 25 along fold lines 28 and 29, respectively.

The width of each of flaps 24 and 25 is less than half the width of panel 6 by twice the thickness of the blank, so that in the assembled brace flaps 26 and 27, which are folded downwardly from flaps 24 and 25 in parallel relationship to each other, are spaced from each other a distance equal to four times the thickness of the paperboard of which the brace is made. In the assembled brace, flaps 24 and 25 are disposed in parallel relationship to top panel 9 and adjacent thereto. Accordingly these flaps are cut along lines 30 and 31, respectively, each of which is shaped to conform to the portion of the perimeter of the cut out 11 juxtaposed therewith.

A pair of back wall panels 32 and 33 are hinged to panels 20 and 21 along fold lines 34 and 35, respectively. The panels 32 and 33 cooperate to form the rear of the block-like structure which comprises the assembled brace and are each slightly less than half the width of panel 6 to provide space therebetween for panels 36, 37, 38 and 39, hereinafter described. Panels 36 and 37 are hinged to panels 32 and 33, respectively, along fold lines 40 and 41. Panel 38 is hinged to panel 36 along fold line 42, and panel 39 is similarly hinged to panel 37 along fold line 43. In the assembled brace, the panels 38 and 39 are folded downwardly along their respective fold lines 42 and 43 to position them in juxtaposition with panels 36 and 37, respectively. The fold lines 42 and 43 are preferably cut part way through the paperboard to permit a sharp bend. Panels 36 and 37 are then folded inwardly along fold lines 40 and 41, respectively, to position panels 36, 37, 38 and 39 parallel to panels 20 and 21, with panels 38 and 39 in face to face contact.

The lower portion of each panel 36, 37, 38 and 39 is provided with a forwardly extending integral tab 44, 45, 46 and 47, respectively. These tabs project into notch 8 to hold the front edges of panels 36, 37, 38 and 39 against displacement relative to front wall 6 when the brace is in its assembled form. The upper adjacent edge portions of panels 36, 37, 38 and 39, which are disposed behind cut out 11 in the assembled brace, are each cut along arcuate lines 48, 49, 50 and 51, respectively, to shape these edge portions to conform to the periphery of the bicycle wheel with which they are in contact when the brace is applied to a bicycle in a shipping container. Panels 24 and 25 are recessed at their rear edges, as indicated at 52 and 53, respectively, to provide clearance for the flaps 14 and 15.

The assembly of the brace is very simple. Panels 38 and 39 are folded downwardly along fold lines 42 and 43 to position them in juxtaposition with panels 36 and 37, respectively. Then panels 32 and 36 are folded inwardly along fold lines 34 and 40, and panels 33 and 37 are similarly folded along fold lines 35 and 41, respectively. The section comprising panels 20, 32, 36 and 38 is then folded inwardly along fold line 18, and the section comprising panels 21, 33, 37 and 39 is folded inwardly along fold line 19 to bring the two sections into a block-like structure with panels 38 and 39 in face to face relationship. The inner top flaps 24 and 25 are folded on fold lines 22 and 23, respectively, and tuck flaps 26 and 27 are folded along their respective fold lines 28 and 29 into surface engagement with the panels 36 and 37. The top wall panel 9 is then folded along fold line 10 and flaps 14 and 15 are folded along fold lines 16 and 17, respectively. Flap 14 is then inserted between back wall panel 32 and the recessed rear edge 52 of flap 24, and flap 15 is simultaneously inserted between panel 33 and the recessed edge 53 of flap 25. The engagement of flaps 14 and 15 with the recessed edges 52 and 53 effects a bridging of the upper edges of all of the vertically extending parallel panels 36, 37, 38 and 39 so that the inner lateral edges of the bifurcated flap or flaps 14 and 15 engage the outermost surface of each of the two outer parallel panels to hold the component parts of the packing brace against separation, and the brace is in the form of a block-like structure that may be handled as a unit. The unit may be secured in a shipping container by adhesive, or may be positioned therein without securing means of any kind. The width of the brace is substantially the same as the interior width of the shipping container, so that no lateral movement is possible. The wheel which enters cut out 11 prevents longitudinal or vertical movement of the brace.

The embodiment of the packing brace illustrated in Figs. 5 and 6 is substantially similar to that previously described, the only essential difference being the substitution of panels 54, 55, 56 and 57 for panels 36, 37, 38 and 39, respectively. In order to simplify the disclosure, the duplicate parts will be designated by the same reference numerals.

Panel 54 is hinged to panel 32 along fold line 58, and panel 55 is similarly hinged to panel 33 along fold line 59. The panel 56, hinged to panel 54 along fold line 60 parallel to fold line 58, and panel 57, hinged to panel 55 along fold line 61 parallel to fold line 59, are folded outwardly along their respective fold line to position panels 56 and 57 adjacent each other and between intermediate panels 54 and 55. The fold lines 60 and 61 are preferably cut part way through the paperboard to permit the panels 56 and 57 to be folded flat against the adjacent panels to which they are hinged.

The lower portions of panels 54 and 56 are completely separated by a cut line 62 offset from fold line 60 by a horizontal cut line 63. Cut lines 62 and 63 form a tab 64 which projects forwardly of panel 56 in the assembled brace. A similar tab 65 projects forwardly of panel 57, and both tabs project into notch 8 to hold the front edges of panels 54, 55, 56 and 57 against displacement relative to front wall panel 6. The upper adjacent edge portions of panels 54, 55, 56 and 57 which are disposed behind cut out 11 in the assembled brace, are each cut along arcuate lines 66, 67, 68 and 69, respectively, to shape these edge portions to conform to the periphery of the bicycle wheel with which they are in contact when the brace is applied to a bicycle in a shipping container.

Although in each embodiment I have shown four panels cooperating to present their edges in position to resist the thrust of a bicycle wheel subjected to a jolt in a longitudinal direction, it will be understood that the number of panels may be varied in accordance with the weight of the bicycle or similar article to which the wheel to be braced is attached. The brace requires no extraneous securing means such as adhesive or staples but is self-secured in correct set-up condition merely by the folding of the blank into the desired brace form.

While the foregoing description sets forth two preferred embodiments of the invention in considerable detail, many changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A packing brace for absorbing the end thrust of a relatively narrow article disposed within an enclosing container comprising a front wall panel, a pair of side wall panels integral therewith, a plurality of vertically extending parallel panels positioned rearwardly of the front wall panel at right angles thereto and between the side wall panels, a rear wall panel connecting each of said parallel panels to one of the side walls and serving to locate the vertical rear edge of the parallel panel, means connecting the forward edge of each of said parallel panels to the front wall panel and serving to locate the front edge of the vertical panel, a portion of the front edge of each of said parallel panels being spaced rearwardly from the front wall panel, and a top wall panel hinged to the front wall panel, a portion of the front and top wall panels being cut away to expose said rearwardly spaced portions of the front edges of the parallel panels.

2. A packing brace for absorbing the end thrust of a relatively narrow article disposed within an enclosing container comprising a front wall panel, a pair of side wall panels, a plurality of vertically extending parallel panels positioned rearwardly of the front wall panel and between the side wall panels, a rear wall panel connecting each of said parallel panels to one of the side walls and serving to locate the vertical rear edge of the parallel panel, interlocking means on the forward edges of the parallel panels and on the front wall panel and serving to locate the front edges of the parallel panels, a portion of the front edge of each of said parallel panels being spaced rearwardly from the front wall panel, a portion of the front and top wall panels being cut away to expose said rearwardly spaced portions of the front edges of the parallel panels, said cut away portions being adapted to receive therethrough the article to confine the same against lateral shifting relative to the plane of the front wall and the rearwardly spaced portions of the front edges of the parallel panels directly receiving the end thrust of the article thus received through said cut away portions.

3. A packing brace for absorbing the end thrust of a relatively narrow article disposed within an enclosing container comprising a front wall panel, a plurality of vertically extending parallel panels positioned rearwardly of the front wall panel, a rear wall panel connecting each of said parallel panels to one of the side walls and serving to locate the vertical rear edge of the parallel panels, a top wall panel hinged to the front wall panel, and a pair of laterally spaced flaps hinged to the rear edge of the top wall panel, said parallel panels being disposed in substantially coextensive face to face contact with each other and the laterally spaced flaps engaging the remote surfaces of the parallel panels at their rear edges to hold them against lateral separation, a portion of the front edge of each of said parallel panels being spaced rearwardly from said front panel, there being a slot formed in said front wall in alignment with said rearwardly spaced portions of the front edges of the parallel panels and designed for reception therethrough of the article, the edges of said slot confining the article against lateral shifting relative to the plane of the front wall and the rearwardly spaced portions of the front edges of the parallel panels receiving the article thereagainst.

4. A packing brace comprising a front wall panel, a plurality of vertically extending parallel panels positioned rearwardly of the front wall panel at substantially right angles thereto, a tab projecting forwardly of each of said parallel panels, a portion of each of said parallel panels being cut away to provide an edge portion which is spaced from said front wall panel, the front wall panel being provided with a notch to receive said tabs, whereby the tabs and notch are interengageable to hold the front edges of the parallel panels against lateral displacement relative to the front wall panel, a top wall panel hinged to the front wall panel, and a pair of flaps hinged to the top wall panel and engageable with the outermost surface of the two outer parallel panels respectively to hold the parallel panels against relative lateral displacement, a portion of the front and top wall panels being cut away to expose a portion of the rearwardly spaced edge portions of the parallel panels.

5. A packing brace for absorbing the end thrust of a relatively narrow article disposed within an enclosing container comprising a front wall panel, a plurality of vertically extending parallel panels positioned rearwardly of the front wall panel substantially perpendicular thereto and having edge portions which are spaced rearwardly from said front wall panel, an aperture in the front wall panel aligned with said parallel panels, tabs projecting forwardly of said parallel panels into the aperture to hold the front edges of the parallel panels against lateral displacement relative to the front wall panel, the width of the aperture being substantially equivalent to the total overall thickness of the tabs engaged therewith, a top wall panel hinged to the front wall panel, and a pair of laterally spaced flaps hinged to the rear edge of the top wall panel and engaging the rear edges of the outermost surfaces of the two outer parallel panels to hold the rear edges of the parallel panels against lateral displacement, there being a slot formed in said front and top wall panels in register with the rearwardly spaced edge portions of the parallel panels and adapted to receive therethrough the article and serving to confine the latter therein against lateral shifting relative to the plane of the front wall panel.

6. A packing brace for absorbing the end thrust of a wheel comprising a front wall panel, a pair of side wall panels, a pair of back wall panels, a plurality of intermediate panels folded forwardly from the edges of the back wall panels and extending in parallel relationship to the side wall panels, a top wall panel hinged to the front wall panel, flap means extending from the top wall panel into engagement with opposite edges of the intermediate panels to hold them against lateral displacement, and a cut out extending through adjacent portions of the front and top wall panels to expose the upper front edge portions of the intermediate panels for engagement with the periphery of a wheel to which the brace is to be applied, the exposed upper front edge portions of the intermediate panels being curved to conform to the periphery of a wheel.

7. A packing brace for absorbing the end thrust of a wheel comprising a sheet of paperboard creased to provide a plurality of panels foldable into a block-like structure including a top wall panel having flaps adapted to hold the panels against separation, a front wall panel having a cut out centrally disposed and extending through a portion of the top wall panel adjacent the front wall panel, a plurality of parallel panels each having a portion of one edge exposed behind the cut out for engagement with the periphery of a wheel to which the brace is to be applied, the exposed edges being curved to conform to the periphery of a wheel, an integral tab projecting from the front edge of each of said parallel panels, and a notch in the front wall panel aligned with said tabs whereby the tabs and notch are interengageable to hold the front edges of the parallel panels against lateral displacement relative to the front wall panel.

8. In a packing brace formed from a single blank of paperboard material for absorbing the end thrust of a vehicle wheel within an enclosing container for the vehicle comprising a front wall panel, a pair of side wall panels hinged to the front wall panel, a pair of rear wall panels hinged to the side wall panels, a top wall panel hinged to said front wall panel, a pair of intermediate thrust-absorbing panels hinged to the rear wall panels and extending forwardly toward the front wall panel in substantially coextensive face-to-face contact, and interlocking means on the forward edge of said intermediate panels and on the front wall panel for locating the front edge of the intermediate panels, the upper regions of the forward edges of said intermediate panels being relieved on a curved bias and spaced rearwardly of said front panel so as to receive thereagainst in edge-to-edge relation the peripheral regions of the vehicle wheel, there being an opening formed in the front wall panel and top wall panel in alignment with said relieved edges designed for reception therethrough of the vehicle wheel, said opening being of a width to confine the vehicle wheel in planar register with said intermediate panels.

9. A packing brace as set forth in claim 8 including interlocking means on the top wall panel and intermediate panels respectively confining the latter against lateral separation and shifting movement relative to the plane of the front wall.

10. A packing brace as set forth in claim 8 including a pair of spaced flaps hinged to the top wall panel and straddling the upper edges of the intermediate panels and serving to lock the same against lateral separation.

11. A packing brace formed from a single blank of paper board material for absorbing the end thrust of a vehicle wheel within an enclosing container for the vehicle, said brace comprising a front wall panel, a pair of side wall panels hinged to the front wall panel, a pair of rear wall panels hinged to the side wall panels, a pair of intermediate thrust-absorbing panels hinged to the rear wall panels and extending forwardly toward the front wall panel in substantially coextensive face-to-face contact, and interlocking means on the forward edge of said intermediate panels and on the front wall panel for locating the front edge of the intermediate panels, the upper regions of the forward edges of said intermediate panels being relieved on a curved bias and spaced rearwardly of said front wall panel so as to receive thereagainst in edge-to-edge relation the peripheral regions of the vehicle wheel, there being a slot in the front wall panel in alignment with said relieved edges designed for reception of the vehicle wheel therethrough, said opening being of a width to confine the vehicle wheel in planar register with said intermediate panels.

JULIAN CARROLL D'ESPOSITO.

References Cited in the file of this patent

UNITED STATES PATENTS

| Number | Name | Date |
| --- | --- | --- |
| 1,158,095 | Yulke | Oct. 26, 1915 |
| 1,946,315 | Ferguson | Feb. 6, 1934 |
| 2,141,399 | Luhn | Dec. 27, 1938 |
| 2,330,345 | Elliott | Sept. 28, 1943 |
| 2,333,244 | Gordon | Nov. 2, 1943 |
| 2,487,528 | Dawson | Nov. 8, 1949 |